United States Patent [19]
Balsells

[11] Patent Number: 5,984,316
[45] Date of Patent: Nov. 16, 1999

[54] ROTARY RECIPROCATING SEALS WITH INTERNAL METAL BAND

[75] Inventor: Peter J. Balsells, Santa Ana, Calif.

[73] Assignee: Bal Seal Engineering Company, Inc., Santa Ana, Calif.

[21] Appl. No.: 08/991,098

[22] Filed: Dec. 12, 1997

[51] Int. Cl.⁶ .................................................. F16J 15/32
[52] U.S. Cl. .................... 277/553; 277/570; 277/647; 277/651
[58] Field of Search ................................ 277/549, 553, 277/554, 572, 570, 647, 650, 651

[56] References Cited

U.S. PATENT DOCUMENTS

| | | | |
|---|---|---|---|
| 2,635,907 | 4/1953 | Heimbuch | 277/553 |
| 4,108,447 | 8/1978 | Scholin | 277/553 |
| 4,655,462 | 4/1987 | Balsells | 277/553 X |
| 5,265,890 | 11/1993 | Balsells | 277/553 X |

*Primary Examiner*—Anthony Knight
*Attorney, Agent, or Firm*—Walter A. Hackler

[57] ABSTRACT

A seal assembly is provided for static, rotary and reciprocating sealing between the shaft and the housing. The seal assembly includes a ring seal in the shape of an annulus having a body portion with an inside flange and an outside flange extending longitudinally therefrom. A spring is disposed between the flanges for radially biasing the flanges from one another to effect sealing between the shaft and the housing and a circular band disposed between the spring and the outside flange is provided for maintaining radial force against the outside flange to retain the ring within the housing and provide static sealing between the ring seal and the housing despite shrinkage of the fluoropolymer seal ring.

23 Claims, 2 Drawing Sheets

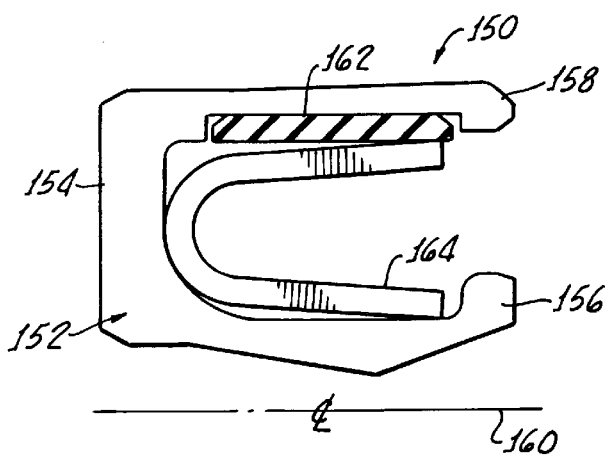
FIG. 7.
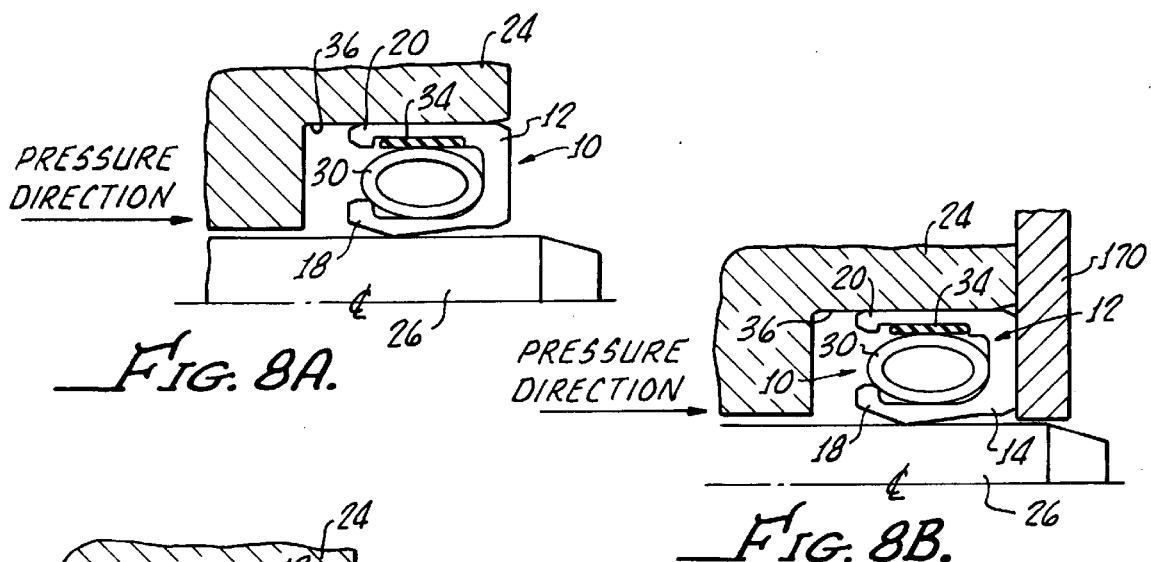
FIG. 8A.
FIG. 8B.
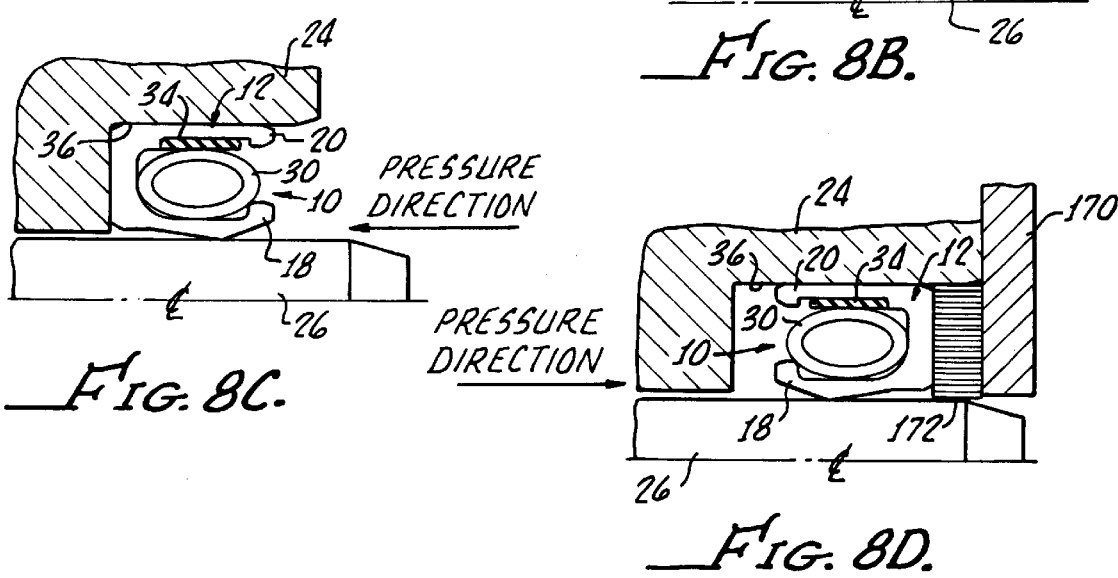
FIG. 8C.
FIG. 8D.

ROTARY RECIPROCATING SEALS WITH INTERNAL METAL BAND

The present invention is generally directed to seal assemblies and is more particularly directed to rotary, reciprocating seals in which the seal is retained in a housing surrounding a shaft for the maintenance of a constant torque between the seal and the shaft under various conditions of temperature, pressure and speed.

Heretofore, rotary seals used in such applications have generally been of the elastomeric type in which the elastomer is bonded to a metal band and the entire assembly press fit into a housing. An example of such seals are those used as oil seals. These particular seals normally have a very large cross section to minimize the transmission of force that occurs when the seal is press fit into the housing and transferred into torque between the seal and the shaft.

However, when the use of fluoropolymer materials, such as polytetrafluoroethylene (PTFE) is necessary because of temperature, pressure conditions, molding cannot be utilized to bond the fluoropolymer material to a metal band. Fluoropolymers do not bond to the metal parts because of the substantial difference in surface tension between fluoropolymers and other materials, such as steel, unless such materials are treated by etching, which removes the fluorine atoms and does permit bonding, but this is not a procedure normally done. Accordingly, integral PTFE/metal seals are usually not utilized.

Another drawback in the use of PTFE as a sealing material is the fact that such seals, when subjected to elevated temperatures under load, shrink upon cooling in returning to normal temperature. This causes the PTFE to shrink away from a metal contact surface, such as housing or other metal band, thereby providing a leakage path. The shrinking of the PTFE is caused by the greater thermal expansion of PTFE over that of the metal parts, which cause the PTFE to expand axially, when it cannot expand radially. Upon cooling, the greater thermal contraction of PTFE to expand axially, when it cannot expand radially. Upon cooling, the greater thermal contraction of PTFE allows a gap between the metal part and the seal. This also is the reason that the fluoropolymer is typically not bonded to a metal surface by molding. Because of these drawbacks, PTFE has not been an acceptable material for use in seals in the rotary, reciprocating applications between a shaft and a housing.

The present invention provides for a seal having a very small cross section which can be press fit into a housing over a shaft and maintain a relatively constant torque between the seal and the shaft. The very small cross section reduces the force developed by the fluid pressure acting on the shaft. The very low coefficient of friction of PTFE assists in this goal.

SUMMARY OF THE INVENTION

In accordance with the present invention, a seal assembly suitable for static, rotary and reciprocating sealing between the shaft and the housing generally includes a seal ring formed from a fluoropolymer in the shape of an annulus having a body portion with an inside flange and an outside flange extending axially therefrom.

Spring means are provided and disposed between the flanges for radially biasing the flanges from one another to cause sealing between the shaft and the housing. A circular band disposed between the spring means and the outside flange provides an outward radial force to retain the seal ring within the housing and provide static sealing between the seal ring and the housing, despite shrinkage of the fluoropolymer seal ring.

Importantly, the band provides sufficient radial force to maintain intimate contact between the seal outside diameter and the seal inside diameter. This radial force importantly does not exceed the force required to create permanent deformation of the fluoropolymer seal ring which would reduce sealing ability between the seal outside diameter and the housing by cold flowing of the fluoropolymer.

Thus, the band, due to its outward radial force, prevents a leakage path from being established past the outside diameter of the seal assembly due to shrinkage of the fluoropolymer.

In one embodiment of the present invention, the band has sufficient flexibility to enable transmission of spring force therethrough to enable sealing between the outside flange and the housing by the spring means. In another embodiment of the present invention, the band has sufficient stiffness to prevent deflection thereof by the spring means. In this embodiment the band provides the total radial force necessary to provide sealing between the outside flange of the seal assembly and the housing.

More particularly, the circular band means may include a groove, corresponding to an outside perimeter of the spring, which provides a means for retaining the spring between the flanges. Alternatively, the circular band may include a radial, inwardly depending lip which provides a means for retaining the spring between the flanges. In this embodiment the inside flange may be substantially shorter than the outside flange.

In any of the embodiments of the present invention, the circular band may comprise a split band, or ring, which can facilitate assembly and additionally provide an added degree of deflection in order to accommodate for variations and tolerances, dimensions, eccentricities, in order to accommodate for variations and tolerances, dimensions, eccentricities, and out-of-roundness, as well as maintain appropriate force to prevent the seal from rotating or moving axially under various conditions of temperature and pressure.

Alternatively, the spring may comprise a rectangular coil spring or a U-spring and the fluoropolymer may comprise polytetrafluoroethylene.

In yet another embodiment of the present invention, a seal ring may be formed from a fluoropolymer in the shape of an annulus having a body portion with an inside flange, a center flange, and an outside flange, all extending axially therefrom. Spring means may be provided and disposed between the inside and center flanges for radially biasing the inside flange against the shaft cause sealing therebetween.

Circular band means may be provided and disposed between the outside and center flanges for providing an outward radial force to retain the seal ring within the housing and cause sealing between the outside flange and the housing despite shrinkage of the fluoropolymer seal ring.

In addition, this embodiment may include O-ring means for providing a secondary static seal between the seal ring and the housing, wherein the O-ring means comprises a circumferential groove in the seal ring body and an elastomer O-ring disposed therein.

As in the hereinabove described alternative embodiments, this last described embodiment may include a split ring as the circular band means and the fluoropolymer may comprise polytetrafluoroethylene.

BRIEF DESCRIPTION OF THE DRAWINGS

The advantages and features of the present invention will appear from the following description, considered in conjunction with the accompanying drawings, in which:

FIG. 7 is a cross sectional view of yet another embodiment of the invention in which the spring is a U-type spring;

FIGS. 8A–8D are cross sectional views showing various assemblies of the seal ring assembly between a shaft and a housing.

DETAILED DESCRIPTION

Figure 1:
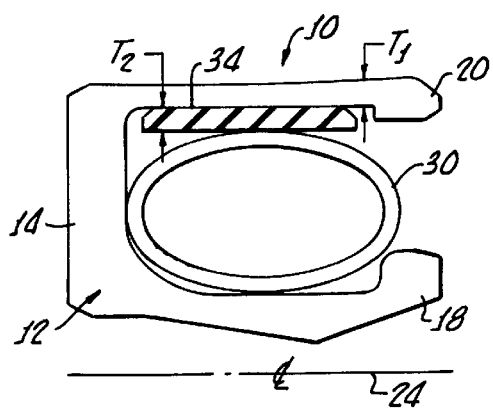
FIG. 1 is a cross sectional view of one embodiment of the present invention generally showing a ring seal, a spring and a band disposed between the spring and an outside flange of the ring seal.

Turning now to FIG. 1 there is shown a seal assembly 10 suitable for static, rotary and reciprocating sealing between the shaft (not shown in FIG. 1) and a housing (not shown in FIG. 1). This seal assembly generally includes a seal ring 12 formed from a fluoropolymer in the shape of an annulus having a body portion 14, with an inside flange 18 and an outside flange 20 extending axially therefrom. This reference being made from a center line 24 shown in a broken line in FIG. 1.

As hereinafter described in greater detail, static sealing occurs between the outside flange 20 and a housing 24 (see FIGS. 8A–8D) and dynamic sealing including rotary and reciprocating sealing occurs between the inside flange 18 and a shaft 26 (see FIGS. 8A–8D).

Turning again to FIG. 1, the seal assembly 10 also includes a spring 30, disposed between the flanges 18, 20, which provides means for radially biasing the flanges 18, 20 from one another to cause sealing between the shaft 26 and housing 24. The spring 30 may be a canted coil spring which can provide a constant force biasing of the flanges 18, 20 through a wide range of deflection.

Importantly, circular band means 34, disposed between the spring 30 and the outside flange 20 provides an outward radial force for retaining the seal ring 12 within the housing 24 and further provides static sealing between the seal ring 12 and the housing 24, despite shrinkage of the fluoropolymer seal ring. In this embodiment the band means has sufficient flexibility to enable transmission of spring force therethrough to enable sealing between the outside flange 20 and the housing 24 by the spring 30. This arrangement provides a seal having a very small cross section that can be press fit into the housing 24, with the spring 30 providing a relatively constant torque between the inside flange 18 and the shaft 26. Preferably, the seal ring is formed from polytetrafluoroethylene (PTFE) which has a very low friction, thus enabling high rotational speeds of the shaft 26.

An additional purpose of the band means 34 is to provide sufficient radial force 10, when mounted in the housing 24, sufficient force is through the PTFE lip seal 20 onto the bore 36 to prevent the seal ring 12 from rotating under normal ambient operating conditions. If the seal assembly 10 is subjected to elevated temperatures, the seal ring 12 loses part of the tensile compressive properties and tends to creep, reducing the interference between the seal OD and the housing 24 and of course risking the possibility that the seal ring 12 rotate around the housing 24 which, of course, is undesirable. Under normal ambient operating conditions, as long as the compressive force developed by the band means 34 is less than the compressive strength of the material, this does not happen.

It is important to appreciate that the present invention is directed to seals made of a fluoropolymer, such as polytetrafluoroethylene, which enables very small cross sections. For example, the ring seal may have an overall cross section or diameter of up to about one to two inches or more, with an over all distance between the inside and the outside flange being between about 0.03 inches and about 0.20 inches. The seal ring 12 is fabricated from a fluoropolymer, preferably polytetrafluoroethylene, and the band 34 enables the outer flange thickness $T_1$ of between about 0.003 inches and about 0.030 inches. The band 34 may be formed from plastic or metal and preferably formed from 300 series stainless steel with modulus of elasticity in tension of about 28 million lb-sq. in with a thickness $T_2$ of about 0.002 to 0.030 inches, enabling transmission of a spring force therethrough as herein described.

However, the band 34 is capable of providing a radial force for retaining the seal assembly 10 in the housing 24 before, during and after of shaft 26 rotation and under various conditions of temperature and pressures, for example, from about –65° F. to about 350° F. and from about vacuum to about 25 psi, the band enables accommodation of variations and tolerances. However, the band should not provide a stress greater than about 1000 psi at ambient temperature, which may induce cold flow of the polytetrafluoroethylene which may reduce the interference occurring between the outside flange 20 and the housing 24.

It should be appreciated that the band 34 may be solid or split, the latter configuration facilitating assembly of the seal assembly 10 into the housing 24 about the shaft 26.

Figure 2:
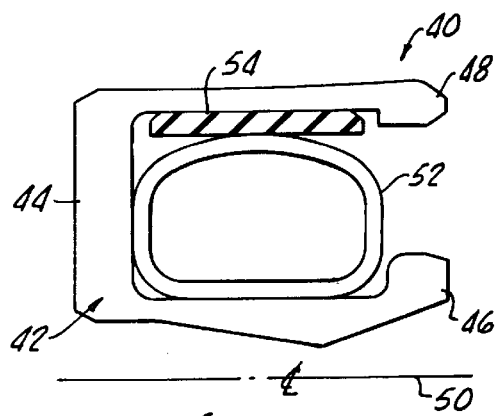
FIG. 2 is another embodiment of the present invention, similar to that shown in FIG. 1 utilizing a rectangular canted coil spring.

Turning now to FIG. 2 there is shown an alternative embodiment 40 of a seal assembly in accordance with the present invention generally including a seal ring 42 having a body portion 44 with an inside flange 46 and an outside flange 48 extending radially therefrom and parallel to a center line indicated at 50 by a dashed line.

A rectangular canted coil spring 52 is disposed between the flanges 46, 48 and a plastic or metal circular band 54 is disposed between the spring 52 and outer flange 48. The use of a rectangular canted spring 52 provides an increased area of contact between the inside flange 46, thereby distributing the sealing force more evenly thereacross.

The band 54 provides the function hereinabove described in connection with the band 34 of embodiment 10 except that band 54 has sufficient thickness to prevent deformation of the metal band due to the spring 52 force thereon. In this manner, the stress acting on the flange 48 is equally or less than the bearing stress of the polytetrafluoroethylene, which reduces the possibility of cold flow. For a seal assembly having dimensions as hereinabove described, the steel band 54 would have a thiclkness of between about 0.003 and about 0.10.

Figure 3:
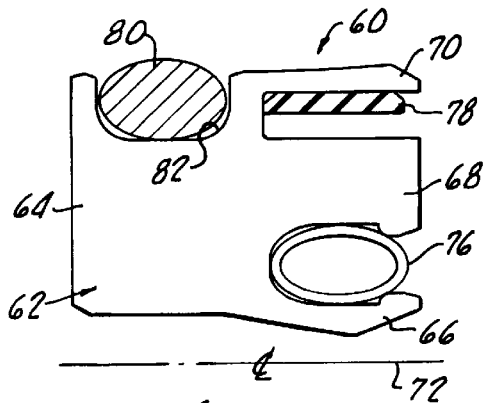
FIG. 3 is a cross section of another embodiment of the present invention in which a ring seal includes three extending flange members, with a spring disposed between an inner flange and a center flange and a metal band disposed between the center flange and an outer flange along with an O-ring provided in the body of the seal ring for providing static sealing between the seal ring and a housing.

Turning now to FIG. 3, another embodiment 60 of a seal assembly made in accordance with the present invention generally includes a seal ring 62 having a body portion 64 with an inside flange 66, a center flange 68 and an outside flange 70 extending axially therefrom and generally parallel to a center line 72 as indicated by dash line in FIG. 3.

As shown, a canted coil spring 76 is disposed between the center flange and the inside flange which provides a means for radially biasing the inside flange against the shaft 26 in order to cause sealing therebetween. A circular band 78, similar to bands 34, 54 hereinabove described, is disposed between the outside and the center flanges to provide a means for retaining the seal ring 62 within the housing 24, despite shrinkage of the polytetrafluoroethylene seal ring 62. In addition, an elastomeric O-ring disposed in groove 82 and the body portions 64 of the seal ring 62 provides for a secondary static seal between the seal ring 62 and the housing 24.

In the embodiment 60, the band 78 has a primary function of maintaining the ring seal 62 within the housing and preventing rotation or axial movement thereof upon rotation or reciprocating movement of the shaft 26. The canted spring 76 primarily functions to provide a dynamic seal between the inside flange 66 and the shaft 26 and the O-ring 80 provides a primary function of providing a static seal between the seal ring 62 and the housing 24.

Figure 4:
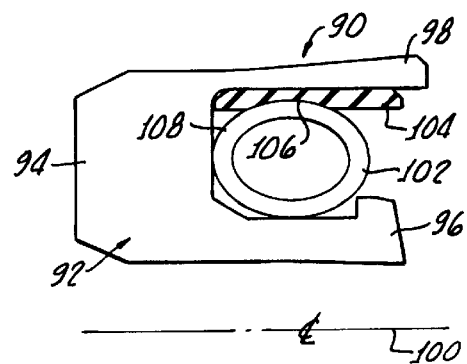
FIG. 4 is a cross sectional view of another embodiment of the present invention in which the band includes a groove corresponding to an outside perimeter of the spring for maintaining the spring within a cavity defined by the inner and outer flanges of the seal ring.

Turning now to FIG. 4, there is shown yet another embodiment 90 in accordance with the present invention, including a seal ring 92 having a body portion 94, an inside flange 96 and an outside flange 98 extending therefrom in an axial direction along the centerline 100 shown in dashed lines. Canted coil spring or a circular type ribbon spring 102 is provided along with a plastic or metal band 104, similar to bands 34, 54 hereinabove described. As an additional feature, the band 104 includes a groove or deformation 106 corresponding to an outside perimeter 108 of the spring 102 which provides a means for retaining the spring 102 between the flanges 96, 98 and preventing any axial movement of the spring 102 between the flanges 96, 98.

Figure 5:
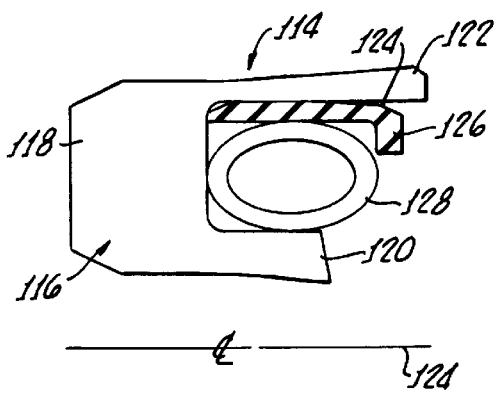
FIG. 5 is a cross sectional view of another embodiment of the present invention in which the band includes a depending lip for retaining a spring in the cavity between the inside and outside flanges of the seal ring and the inside flange is substantially shorter than the outside flange.

Still another embodiment 114 is shown in FIG. 5, which includes a seal ring 116 having a body portion 118 with an inner flange 120 and an outer flange 122 extending axially therefrom generally parallel to a centerline 124 indicated by the dashed line in FIG. 5.

In this embodiment 114, the band 124 includes a depending lip 126 which provides a means for retaining a spring 128 between the flanges 121, 122. Because the spring 128 is retained between the flanges 120, 122 by the band lip 126, the inside flange 120 may be made considerably shorter than the outside band 122 which enables a greater concentrated force to be applied by the spring 128 when the inside flange 120 is urged against the shaft 26.

Figure 6:
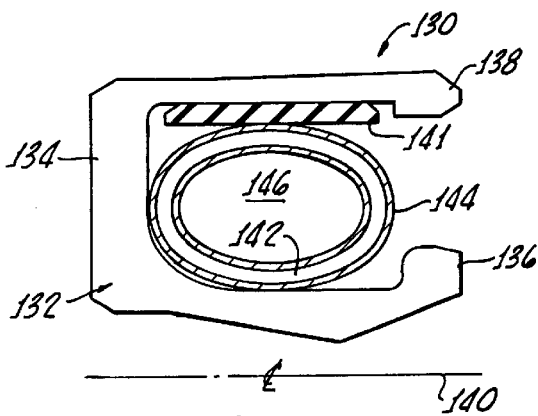
FIG. 6 is a cross sectional view of yet another embodiment of the present invention in which the spring is surrounded with elastomer at both the inside and outside of the spring coil.

FIG. 6 illustrates another embodiment 130 in accordance with the present invention including a seal ring 132 having a body portion 134 with an inside flange 136 and an outside flange 138 extending radially therefrom generally along a centerline 140 as indicated by the dashed line in FIG. 6. A band 141 is disposed between a spring 142 as hereinabove described, in which the spring 142 is loaded with an elastomer 144 having a hollow center 146 in order to obtain a greater distribution of force and improved sealing ability of the seal assembly 130.

Turning to FIG. 7, there is shown yet another embodiment 150 for a seal assembly in accordance with the present invention, generally including a seal ring 152 having a body 154 and inside flange 156 and an outside flange 158, extending radially therefrom, generally along a centerline 160 shown in dashed line, FIG. 7. A band 162 is provided which is similar to the bands 34, 154, hereinabove described. In addition, a U-spring 164 is provided for biasing the flanges 156, 158 from one another as hereinabove described.

As earlier referenced, FIGS. 8A–8D show various assembly views of the seal assembly 10 mounted in a housing 24 in a sealing arrangement around a shaft 26. FIGS. 8A and 8C show the assembly 10 in various positions depending on pressure direction as indicated in FIGS. 8A and 8C and FIGS. 8B, 8D include a backup plate 170 for the seal assembly 10 which supports the seal ring 12 by the body portion. In addition, a backup ring 172 as shown in FIG. D may be provided between the plate 170 and the seal ring 12.

Although there has been hereinabove described a specific arrangement of a seal assembly in accordance with the present invention, for the purpose of illustrating the manner in which the invention may be used to advantage, it should be appreciated that the invention is not limited thereto. Accordingly, any and all modifications, variations or equivalent arrangements which may occur to those skilled in the art, should be considered to be within the scope of the invention as defined in the appended claims.

What is claimed is:

1. A seal assembly suitable for static, rotary and reciprocating sealing between a shaft and a housing, said seal assembly comprising:

a seal ring formed from a fluoropolymer in the shape of an annulus having a body portion with an inside flange and an outside flange extending axially therefrom;

spring means, disposed between the flanges, for radially biasing the flanges from one another to cause sealing between the shaft and the housing; and circular band means, disposed between the spring means and the outside flange, for providing an outward radial force to retain the seal ring within the housing without rotation thereof, and provide static sealing between the seal ring and the housing despite shrinkage of the fluoropolymer seal ring, the band means having sufficient flexibility to enable transmission of spring force therethrough to enable sealing between the outside flange and the housing of said spring means.

2. The seal assembly according to claim 1, wherein said circular band means includes groove means corresponding to an outside perimeter of said spring means, for retaining said spring means between the flanges.

3. The seal assembly according to claim 1 wherein said circular band means includes radial, inwardly depending lip means for retaining said spring means between the flanges.

4. The seal assembly according to claim 3 wherein said inside flange is substantially shorter than said outside flange.

5. The seal assembly according to claim 1, wherein said circular band means comprises a split ring.

6. The seal assembly according to claim 1, wherein said spring means comprises a rectangular coiled spring.

7. The seal assembly according to claim 1, wherein said spring means comprises a ribbon circular spring.

8. The seal assembly according to claim 1, wherein said spring means comprises a U-spring.

9. The seal assembly according to claim 1 wherein the fluoropolymer comprises polytetrafluoroethylene.

10. A seal assembly suitable for providing static, rotary and reciprocating sealing between a shaft and a housing, said seal assembly comprising:

a seal ring formed from a fluoropolymer in the shape of an annulus having a body portion with an inside flange and an outside flange extending axially therefrom;

spring means, disposed between the flanges, for radially biasing the inside flange against the shaft to cause sealing therebetween; and circular band means, disposed between the flanges and against the outer flange and spring means, for providing an outward radial force against the outside flange in order for both to retain the seal ring within the housing and for causing a static and dynamic seal between the outside flange and the housing, despite shrinkage of the fluoropolymer seal ring, the band means having sufficient stiffness to prevent deflection thereof by the spring means.

11. The seal assembly according to claim 10 wherein said circular band means includes groove means corresponding to an outside perimeter of said spring means, for retaining said spring means between the flanges.

12. The seal assembly according to claim 10 wherein said circular band means includes radial, inwardly depending lip means for retaining said spring means between the flanges.

13. The seal assembly according to claim 12 wherein said inside flange is substantially shorter than said outside flange.

14. The seal assembly according to claim 12, wherein said circular band means comprises a split ring.

15. The seal assembly according to claim 12, wherein said spring means comprises a rectangular coiled spring.

16. The seal assembly according to claim 12, wherein said spring means comprises a U-spring.

17. The seal assembly according to claim 12 wherein said spring means comprises a ribbon circular spring.

18. The seal assembly according to claim 12 wherein the fluoropolymer comprises polytetrafluoroethylene.

19. A seal assembly suitable for providing rotary and reciprocating sealing between a shaft and a housing, said seal assembly comprising:

a seal ring formed from a fluoropolymer in the shape of an annulus having a body portion with an inside flange, center flange and outside flange extending axially therefrom;

spring means, disposed between the inside and center flanges for radially biasing the inside flange against the shaft to cause sealing therebetween; and circular band means, disposed between the outside and center flanges, for providing an outward radial force to retain the seal ring within the housing and cause sealing between the outside flange and the housing despite shrinkage of the fluoropolymer seal ring.

20. The seal assembly according to claim 18 further comprising O-ring means for providing a secondary static seal between the seal ring and the housing.

21. The seal assembly according to claim 20 wherein said O-ring means comprises a circumferential groove in the seal ring body and an elastomer O-ring disposed therein.

22. The seal assembly according to claim 21 wherein said circular band means comprises a split ring.

23. The seal assembly according to claim 19 wherein the fluoropolymer comprises polytetrafluoroethylene.

* * * * *